(12) United States Patent
Iwata

(10) Patent No.: US 7,705,485 B2
(45) Date of Patent: Apr. 27, 2010

(54) POWER SOURCE AND IMAGE FORMING APPARATUS

(75) Inventor: Atsuki Iwata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 979 days.

(21) Appl. No.: 11/377,246

(22) Filed: Mar. 17, 2006

(65) Prior Publication Data

US 2006/0214512 A1    Sep. 28, 2006

(30) Foreign Application Priority Data

Mar. 22, 2005    (JP) .............................. 2005-081970

(51) Int. Cl.
*H02J 3/14* (2006.01)
(52) U.S. Cl. ...................................... 307/38
(58) Field of Classification Search .................. 307/38, 307/43, 39, 41
See application file for complete search history.

(56) References Cited

U.S. PATENT DOCUMENTS

| | | | | |
|---|---|---|---|---|
| 4,323,789 | A | * | 4/1982 | Dion ............................ 307/81 |
| 5,384,490 | A | * | 1/1995 | Swartz, Jr. ..................... 307/38 |
| 5,907,238 | A | * | 5/1999 | Owerko et al. ................ 323/349 |
| 6,766,222 | B1 | * | 7/2004 | Duley ........................... 700/286 |
| 6,845,409 | B1 | * | 1/2005 | Talagala et al. ................ 710/20 |

FOREIGN PATENT DOCUMENTS

| | | |
|---|---|---|
| JP | 5-130733 | 5/1993 |
| JP | 2002-10492 | 1/2002 |
| JP | 2002-345148 | 11/2002 |
| JP | 2002-354793 | 12/2002 |
| JP | 2003-244949 | 8/2003 |
| JP | 3484013 | 10/2003 |

* cited by examiner

*Primary Examiner*—Albert W Paladini
(74) *Attorney, Agent, or Firm*—Oblon, Spivak, McClelland, Maier & Neustadt, L.L.P.

(57) ABSTRACT

A power source is disclosed. The power source includes a first power source applying a first voltage to a control unit and a second power source applying a second voltage to a unit controlled by the control unit. The power source includes a first power supplying unit, which includes a main power switch and a first relay and supplies electric power to the first power source, and a second power supplying unit, which includes the main power switch and a second relay and supplies the electric power to the second power source. The electric power is supplied to the first power source by turning on the main power switch, and the first relay is turned on by a voltage output from the second power source. The electric power is supplied to the second power source by turning on the second relay by a voltage output from the first power source.

8 Claims, 10 Drawing Sheets

POWER SOURCE AND IMAGE FORMING APPARATUS

BACKGROUND OF THE INVENTION

1. Field of the Invention

The present invention generally relates to a power source which applies a voltages to a line and a different voltage to another line; in particular, a power source which includes a first power source unit that applies a voltage to a control unit and a second power source unit that applies a different voltage to a unit to be controlled by the control unit; and further, to an image forming apparatus which uses the power source. In addition, the power source can be used in many apparatuses, such as a scanner, a printer, a copying machine, a facsimile, a computer, and so on.

2. Description of the Related Art

In Patent Document 1, an image forming apparatus is disclosed. In the image forming apparatus, when an interlock switch disposed at the output side of a power source which outputs a control voltage of 5 V and a load driving voltage of 24 V is turned off (non-conductive), a load connecting to the 24 volt line is turned on (conductive) in response to OFF of the interlock switch, and a capacitor having a large capacity on the 24 V power line is discharged via the load. With this, protective control at an interlock time is established.

In Patent Document 2, a power source and an image forming apparatus are disclosed. The power source is a DC power source for outputting plural voltages. In the power source, a relay coil is connected to an output line of one power source in plural power sources outputting different voltages via an interlock switch and a relay contact is connected to an output line of another power source.

In Patent Document 3, a power source and an image forming apparatus are disclosed. The power source includes plural power sources outputting different voltages and a signal processing device that stops a power output of each of the power sources in an order storing in a memory when a power switch is turned off.

As a power source voltage applied to electrical units in electrical apparatuses, an OA (office automation) apparatus, and a FA (factory automation) apparatus such as a copying machine, a printer, and a facsimile, various voltages such as 3 V, 5 V, 12 V, 15 V, and 24 V are used. Each of these power source voltages is used in detection of various signals, operations for various actuators and motors, and control for the actuators and the motors. As the power source voltage for the detection and the control, 3 V or 5 V is used. In addition, as the power source voltage for various operations of the actuators, the motors, and other loads, 12 V or 24 V is used.

When the power control does not work normally in these apparatuses, the supply of power to the various loads becomes uncertain, and in some cases, a switching device for supplying the power is broken; further, the apparatus may be broken by a wrong power supply. As reasons why the power control does not work normally, it is considered that they include a runaway CPU and a proper voltage not being applied to power control.

For the runaway CPU, a watchdog timer is disposed, or plural CPUs monitor each other's operations, and when an abnormal operation is detected, a reset signal is generated. From a view point that a proper voltage is applied to the power control, in a steady state after each voltage rise, a voltage in a proper voltage range is supplied and there may be no problem.

[Patent Document 1] Japanese Laid-Open Patent Application No. 9-297507 (Japanese Patent No. 3484013)

[Patent Document 2] Japanese Laid-Open Patent Application No. 2002-345148

[Patent Document 3] Japanese Laid-Open Patent Application No. 2002-354793

However, conventionally, at a rising time or a falling time of power, a sequence or the order of outputting voltages is not set. That is, a sequence in which a control voltage is output with priority is not set. In a power source which outputs many voltages or has many power source units, a sequence, which outputs the control voltage with priority in the power control before outputting other voltages at a rising time of the power source, has not been set. Further, a sequence, which holds the control voltage and stops other voltages before stopping the control voltage at a falling time of the power source, has not been set. That is, the above sequences have not been set in the power source.

SUMMARY OF THE INVENTION

In a preferred embodiment of the present invention, there is provided a power source and an image forming apparatus which uses the power source. The power source outputs plural voltages or outputs electric power to each of plural lines individually. In addition, the power source surely outputs a voltage to a specific line before outputting a voltage to other lines and maintains the voltage to the specific line until the other lines stop at a rising time and a falling time of an output voltage of the power source. For example, when a main power switch of the power source is turned on or off, a sequence in which a start of a voltage output or a stop of the voltage output for a specific line is performed is realized.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a power source an image forming apparatus which uses the power source.

According to one aspect of the present invention, there is provided a power source which includes a first power source unit that applies a first operating voltage to a control unit and a second power source unit that applies a second operating voltage to a unit to be controlled by the control unit. The power source includes a first electric power supplying unit that supplies electric power to the first power source unit, and a second electric power supplying unit that supplies the electric power to the second power source unit. The first electric power supplying unit includes a parallel circuit composed of a main power switch and a first switching unit capable of being electrically controlled, the electric power is supplied to the first power source unit by turning on the main power switch, and the first switching unit is turned on by a voltage output from the second power source unit. The second electric power supplying unit includes a series circuit composed of the main power switch and a second switching unit capable of being electrically controlled, and the electric power is supplied to the second power source unit by turning on the second switching unit by a voltage output from the first power source unit.

According to another aspect of the present invention, the second switching unit which is turned on by the voltage output from the first power source unit is disposed at the output side of the second power source unit.

According to another aspect of the present invention, the first switching unit is a first TRIAC (triode AC switch) and the second switching unit is a second TRIAC.

According to another aspect of the present invention, the second switching unit is a switching element in a primary side chopping circuit of a converter in the second power source unit. The power source further includes a converter operation signal controlling unit that outputs to the second power source unit a signal which allows turning on the switching element when a voltage output from the first power source unit exists and a signal which prevents turning on the switching element when a voltage output from the first power source unit does not exist.

According to another aspect of the present invention, the power source further includes a first power saving controlling switch. The first power saving controlling switch is disposed on a voltage output line from the first power source unit.

According to another aspect of the present invention, the power source further includes a second power saving controlling switch. The second power saving controlling switch is disposed between the first power source unit and the second switching unit.

According to another aspect of the present invention, there is provided a power source which includes a first power source unit that applies a first operating voltage to a control unit and a second power source unit that applies a second operating voltage to a unit to be controlled by the control unit. The power source includes a first electric power supplying unit that supplies electric power to the first power source unit, and a second electric power supplying unit that supplies the electric power to the second power source unit. The first electric power supplying unit includes a parallel circuit composed of a main power switch and a first switching unit capable of being electrically controlled. The second electric power supplying unit includes the main power switch. The electric power is simultaneously supplied to the first power source unit and the second power source unit when the main power switch is turned on, and the first switching unit is turned on by a voltage output from the second power source unit.

According to another aspect of the present invention, there is provided a power source which includes a first power source unit that applies a first operating voltage to a control unit and a second power source unit that applies a second operating voltage to a unit to be controlled by the control unit. The power source includes a first electric power supplying unit that supplies electric power to the first power source unit, and a second electric power supplying unit that supplies the electric power to the second power source unit. The the first electric power supplying unit includes a main power switch, and the second electric power supplying unit includes a series circuit composed of the main power switch and a second switching unit capable of being electrically controlled. The electric power is supplied to the first power source unit by turning on the main power switch, and the electric power is supplied to the second power source unit by turning on the second switching unit by a voltage output from the first power source unit.

According to another aspect of the present invention, there is provided an image forming apparatus. The image forming apparatus includes the power source as described above and an image forming unit to which electric power is supplied from the power source.

According to another aspect of the present invention, the image forming apparatus further includes a manuscript reading unit that forms image data expressing an image by reading the image of a manuscript, and an image data processing unit that transforms the image data into image data fitting to an image being formed by the image forming unit.

EFFECT OF THE INVENTION

According to an embodiment of the present invention, there is provided a power source which includes a first power source unit that applies a first operating voltage to a control unit and a second power source unit that applies a second operating voltage to a unit to be controlled by the control unit. The power source includes a first electric power supplying unit that supplies electric power to the first power source unit, and a second electric power supplying unit that supplies the electric power to the second power source unit. The first electric power supplying unit includes a parallel circuit composed of a main power switch and a first switching unit capable of being electrically controlled, and the electric power is supplied to the first power source unit by turning on the main power switch, and the first switching unit is turned on by a voltage output from the second power source unit. The second electric power supplying unit includes a series circuit composed of the main power switch and a second switching unit capable of being electrically controlled, and the electric power is supplied to the second power source unit by turning on the second switching unit by a voltage output from the first power source unit. Therefore, when the main power switch is turned on, the first power source unit is turned on and a voltage output from the second switching unit is applied to the second power source; then the second power source unit is turned on. Consequently, the first power source unit is always in the ON state when the second power source unit is turned on. When the main power switch is turned off, the electric power to the second power source unit is cut off and the electric power to the first switching unit starts to fall. When the first switching unit is turned off, the first power source unit is turned off. Therefore, the second power source unit is always in the OFF state when the first power source unit is turned off.

In addition, the second switching unit which is turned on by the voltage output from the first power source unit is disposed at the output side of the second power source unit. Therefore, when the main power switch is turned on, the first power source unit is turned on and a voltage output from the second power source unit starts to be applied to the unit to be controlled by turning on the second switching unit. When the main power switch is turned off, the second power source unit is turned off; after this, the first power source unit is turned off.

According to another embodiment of the present invention, there is provided a power source which includes a first power source unit that applies a first operating voltage to a control unit and a second power source unit that applies a second operating voltage to a unit to be controlled by the control unit. The power source includes a first electric power supplying unit that supplies electric power to the first power source unit, and a second electric power supplying unit that supplies the electric power to the second power source unit. The first electric power supplying unit includes a parallel circuit composed of a main power switch and a first switching unit capable of being electrically controlled. The second electric power supplying unit includes the main power switch. The electric power is simultaneously supplied to the first power source unit and the second power source unit when the main power switch is turned on, and the first switching unit is turned on by a voltage output from the second power source unit. Therefore, when the main power switch is turned off, the electric power to the second power source unit is cut off and the electric power to the first switching unit starts to fall. When the first switching unit is turned off, the first power source unit is turned off. That is, when the main power switch is turned off, first, the second power source unit is turned off, and after this, the first powers source unit is turned off. The first power source unit is always in the ON state when the second power source unit is turned on.

According to another embodiment of the present invention, there is provided a power source which includes a first power source unit that applies a first operating voltage to a control unit and a second power source unit that applies a second operating voltage to a unit to be controlled by the control unit. The power source includes a first electric power supplying unit that supplies electric power to the first power source unit, and a second electric power supplying unit that supplies the electric power to the second power source unit. The the first electric power supplying unit includes a main power switch, and the second electric power supplying unit includes a series circuit composed of the main power switch and a second switching unit capable of being electrically controlled. The electric power is supplied to the first power source unit by turning on the main power switch, and the electric power is supplied to the second power source unit by turning on the second switching unit by a voltage output from the first power source unit. Therefore, when the main power switch is turned on, the first power source unit is turned on and a voltage output from the second switching unit is applied to the second power source, then the second power source unit is turned on. Consequently, the first power source unit is always in the ON state when the second power source unit is turned on.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Best Mode of Carrying Out the Invention

A best mode of carrying out the present invention is described with reference to the accompanying drawings.

First Embodiment

Figure 1:
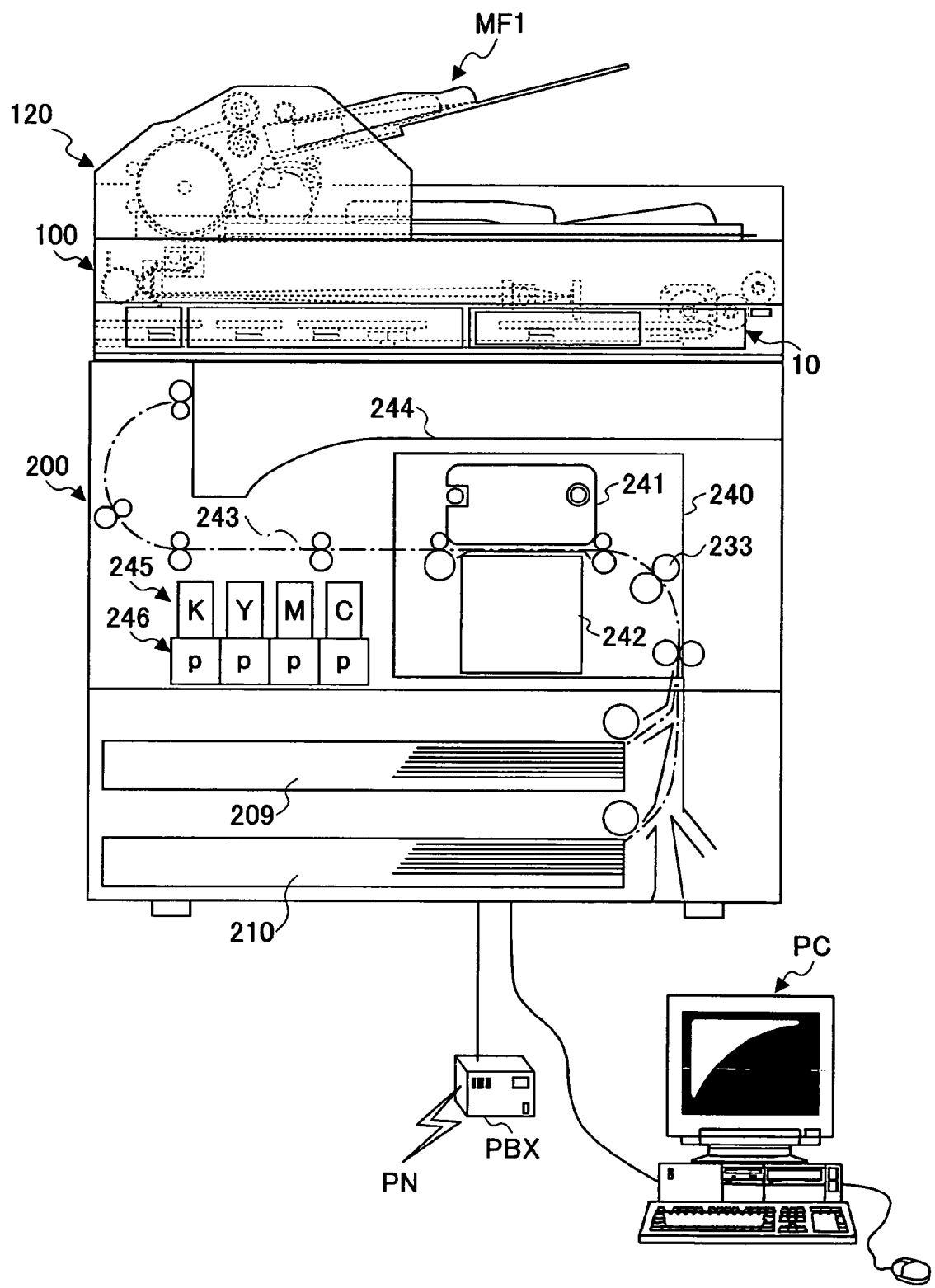
FIG. 1 is a schematic diagram showing a mechanical outline of a multifunctional copying machine according to embodiments of the present invention.

FIG. 1 is a schematic diagram showing a mechanical outline of a multifunctional copying machine MF1 according to embodiments of the present invention. The multifunctional copying machine MF1 is a full color digital multifunctional copying machine. As shown in FIG. 1, the multifunctional copying machine MF1 includes an ADF (automatic draft feeder) 120, an operations board 10, a color scanner 100, and a color printer 200. In this, the operations board 10 and the color scanner 100 with the ADF 120 can be removed from the color printer 200. The color scanner 100 includes a control board with a power device driver, an input for sensors, and a controller; communicates with an engine controller (CPU 301, see FIG. 2) directly or indirectly; and reads an image of a manuscript by being controlled in timing by the engine controller.

A LAN (local area network) to which a PC (personal computer) is connected is connected to a controller board 400 (see FIG. 2) to which an engine 300 (see FIG. 2) including the color scanner 100, the color printer 200, and an image input and output processing unit 302 (see FIG. 2) are connected. In addition, a PBX (private branch exchange) connecting to a PN (public network; facsimile communication network) is connected to a FCU (facsimile control unit) 417 (see FIG. 2).

The color printer 200 in the multifunctional copying machine MF1 shown in FIG. 1 is a full color inkjet printer. In an image forming unit 240 of the color printer 200, a color inkjet head is installed in a carriage 241 which reciprocates in the main scanning direction (orthogonal to the plane of the drawing shown in FIG. 1). In the color inkjet head, C, M, Y, and K ink ejecting heads, in which many ink ejecting nozzles are densely arrayed in the sub scanning direction (the direction from right to left in the drawing shown in FIG. 1), are arrayed in the main scanning direction. A color image is formed by ejecting color ink from the C, M, Y, and K ink ejecting heads in a predetermined width in the sub scanning direction by one scan of the carriage 241 in the main scanning direction, then, a paper is carried in the sub scanning direction by the predetermined width and one scan is performed again in the main scanning direction. By the repetition of the above, a color image is formed on the paper. The paper carried out from a paper cassette 209 or 210 is sent to registration rollers 233, and is carried along a paper carrying line 243. The paper on which the image is formed is sent to a paper outputting tray 244. The reference number 245 indicates ink cartridges filled with corresponding C, M, Y, and K ink, and ink from the ink cartridge 245 is pumped up by a pump 246 so as to refill the corresponding color ink ejecting head.

Soon after the power source is turned on, the carriage 241 is moved to a position of a remaining ink collecting vessel 242 located outside a paper width region in the main scanning direction, and test ink ejection is performed.

Figure 2:
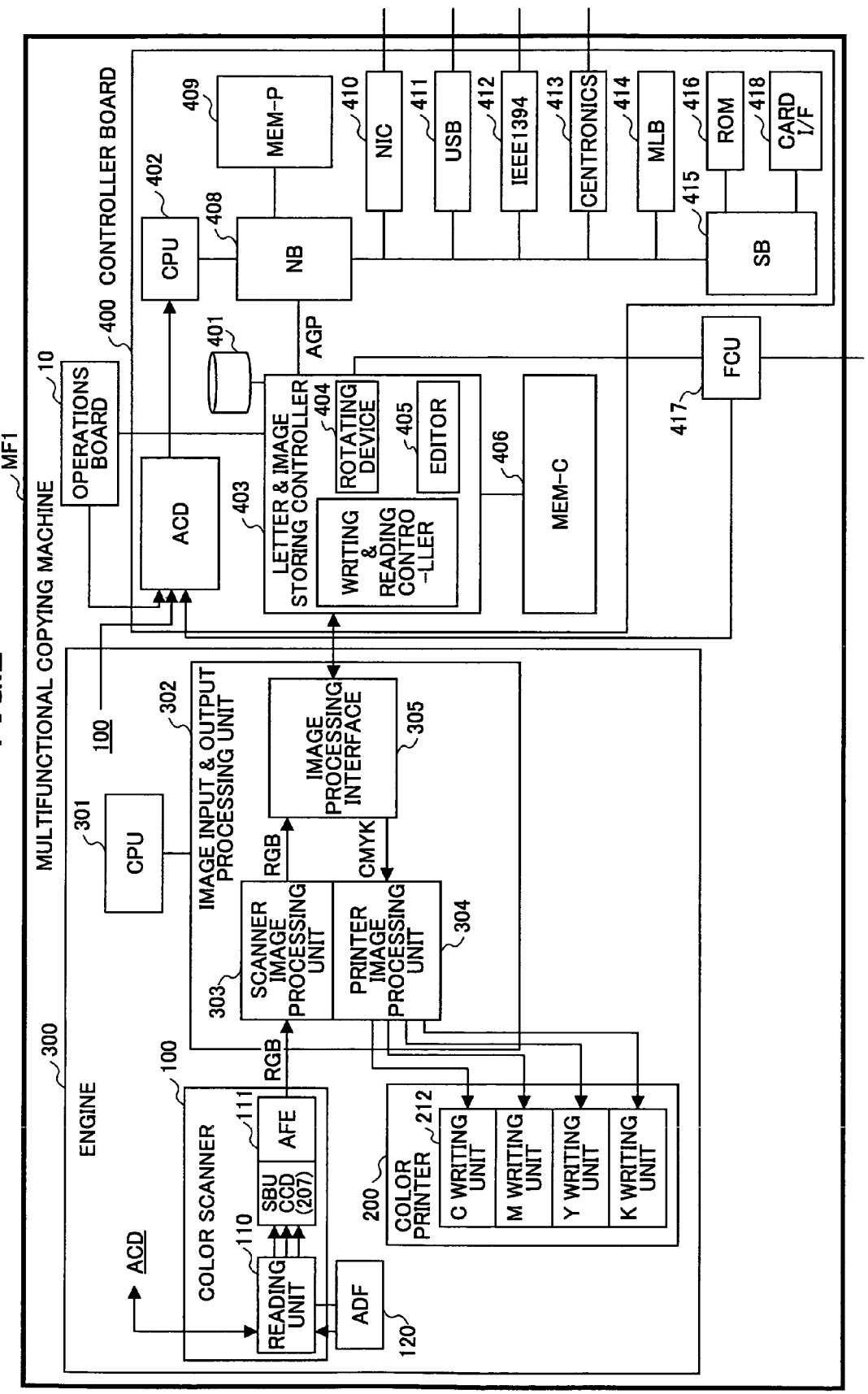
FIG. 2 is a block diagram of an image processing system of the multifunctional copying machine shown in FIG. 1.

FIG. 2 is a block diagram of an image processing system of the multifunctional copying machine MF1 shown in FIG. 1. The multifunctional copying machine MF1 includes the engine 300 which reads a manuscript image and prints a color image, the controller board 400, and the operations board 10. The engine 300 includes the CPU 301 (engine controller) which controls image reading and printing processes, the color scanner 100, the color printer 200, and the image input and output processing unit 302 composed of an ASIC (application specific IC).

A reading unit 110 in the color scanner 100 includes a CPU, a ROM, and a RAM. The CPU controls the entire operation in the color scanner 100 by loading a program stored in the ROM into the RAM and executing the program. The color scanner 100 is connected to the CPU 301 for process control via a communication line, and performs a designated operation by receiving/transmitting a command and data. The CPU in the reading unit 110 controls to detect a signal from a filler sensor (manuscript detecting sensor) and a basic point sensor, and controls ON/OFF of a pressure plate switch and a cooling fan. In the reading unit 110, a scanner motor driver generates an excitation pulse sequence by being driven by a PWM output from the CPU and drives a pulse motor for manuscript scanning and deriving.

A manuscript image is lighted by an output from a halogen lamp to which electric power is supplied from a lamp regulator, and an image is formed on a CCD 207 in a SBU (sensor board unit) by light (optical signal) reflected from the manuscript. The optical signal is transmitted to the CCD 207 including three line sensors for reading R, B, and G, via a first mirror installed in a first carriage of the color scanner 100 with the halogen lamp, third and fourth mirrors installed in a second carriage which is driven by ½ speed of the first carriage in the same direction, and a lens. The CCD 207 outputs an analog image signal of RGB pixels to a digital signal processing circuit (AFE) 111. The AFE 111 is an image signal processing unit which amplifies an image signal, converts the image signal into digital data, and applies a shading correction to the digital data.

The controller board 400 includes a CPU 402, a letter and image storing controller 403 composed of an ASIC, a HDD (hard disk drive) 401, an MEM-C (local memory) 406, an MEM-P (system memory) 409, a north bridge (NB) 408, a south bridge (SB) 415, a NIC (network interface card) 410, a USB device 411, an IEEE 1394 device 412, a centronics device 413, and so on. The operations board 10 is connected to the letter and image storing controller 403 in the controller board 400. The FCU 417 is also connected to the letter and image storing controller 403 via a PCI bus.

The CPU 402 can transmit or receive letter and image information to or from a PC (personal computer) connected to a LAN via the NIC 410 or another PC via the Internet. In addition, the CPU 402 can communicate with a PC, a printer, or a digital camera by using the USB device 411, the IEEE 1394 device 412, or the centronics device 413.

The SB 415, the NIC 410, the USB device 411, the IEEE 1394 device 412, the centronics device 413, an MLB 414 are connected to the NB 408 via a PCI bus. The MLB 414 is a board connected to the engine 300 via the PCI bus. The MLB 414 converts letter and image data input from outside into image data, and the converted image data are output to the engine 300.

The MEM-C 406 and the HDD 401 are connected to the letter and image storing controller 403 in the controller board 400, and the CPU 402 is connected to the letter and image storing controller 403 via the NB 408 which is a chip set. The letter and image storing controller 403 is connected to the NB 408 via an AGP (accelerated graphic port).

The CPU 402 controls the entire operation of the multifunctional copying machine MF1. The NB 408 is a bridge to connect the CPU 402 with the MEM-P 409, the SB 415, and the letter and image storing controller 403. The MEM-P 409 is an image forming memory and so on in the multifunctional copying machine MF1. The SB 415 is a bridge to connect the NB 408 with a PCI bus and peripheral devices. A card IF 418 for reading/writing data from/to an SD memory card and an external ROM 416 are connected to the SB 415. An SD card reader is connected to the card IF 418, and data in an SD card can be read and data can be written in the SD card by the SD card reader.

The MEM-C 406 is a memory used as a buffer for copying images and as a buffer for codes. The HDD 401 is a memory for storing image data, document data, a program, font data, forms, LUTs (look up tables), and so on. The operations board 10 is an operating section which receives input operations from a user and displays information for the user.

In FIG. 2, flows of image data among the color scanner 100, the color printer 200, and the image input and output processing unit 302 are shown. The image input and output processing unit 302 includes a scanner image processing unit 303, a printer image processing unit 304, and an image processing interface (I/F) 305. The scanner image processing unit 303 applies a reading γ correction and an MTF correction to each of R, G, and B image data obtained by reading a manuscript image in the color scanner 100. The printer image processing unit 304 converts the R, G, and B image data into recording color data (printing data) of c, m, y, and k which match image expression characteristics of C, M, Y, and K, respectively, of the color printer 200. The image processing I/F 305 outputs manuscript read data RGB to the letter and image storing controller 403 and gives image data of C, M, Y, and K output from the letter and image storing controller 403 to the printer image processing unit 304.

In the case of black and white copying, image data are output from the scanner image processing unit 303 to the image processing interface 305. The image processing interface 305 outputs the image data to the printer image processing unit 304. The printer image processing unit 304 converts the image data into k recording color data, and if necessary, applies scaling and additional processing to the data, applies printer γ conversion and gradation processing to the data, and outputs the processed data to a K writing unit 212 of the color printer 200. The writing unit 212 controls inkjet recording of a k recording head in the color printer 200, based on the k recording color data output from the printer image processing unit 304.

In the case of color copying, RGB image data output from the scanner image processing unit 303 are temporarily stored in the MEM-C 406 or the HDD 401 via the image processing interface 305 and the letter and image storing controller 403. After this, the RGB image data are read and a color image is printed (copied) or sent to the outside.

In the case of printing data which are stored in or are received from the outside, the image data are sent to the printer image processing unit 304 via the letter and image storing controller 403 and the image processing interface 305. The printer image processing unit 304 converts the image data into c, m, y, and k recording color data. If necessary, scaling and additional processing are applied to the data, the printer γ conversion and the gradation processing are applied to the data, and the data are output to the writing unit 212 of the color printer 200.

Signal lines of signals detected from the pressure plate switch of the reading unit 110 and the filler sensor (manuscript detecting sensor) of the ADF 120 are connected to an ACD (state change detection circuit) in the controller board 400. Further, a signal line of a key operation signal detected from a power key switch of the operations board 10, and a signal line of a signal received at the FCU 417 are also connected to the ACD in the controller board 400. During an ON state of a main power switch 79 (see FIG. 3), an operating voltage +5 VE, which is continuously output even if a power source circuit 80 (see FIG. 3) is in a sleep mode, is applied to the ACD (state change detection circuit). If the operating voltage +5 VE is applied, when a signal change occurs in any one of the signal lines connected to the ACD, a change detecting signal is given to the CPU 402. The CPU 402 changes over the power source circuit 80 from the sleep mode to a standby mode (operating mode).

Figure 3:
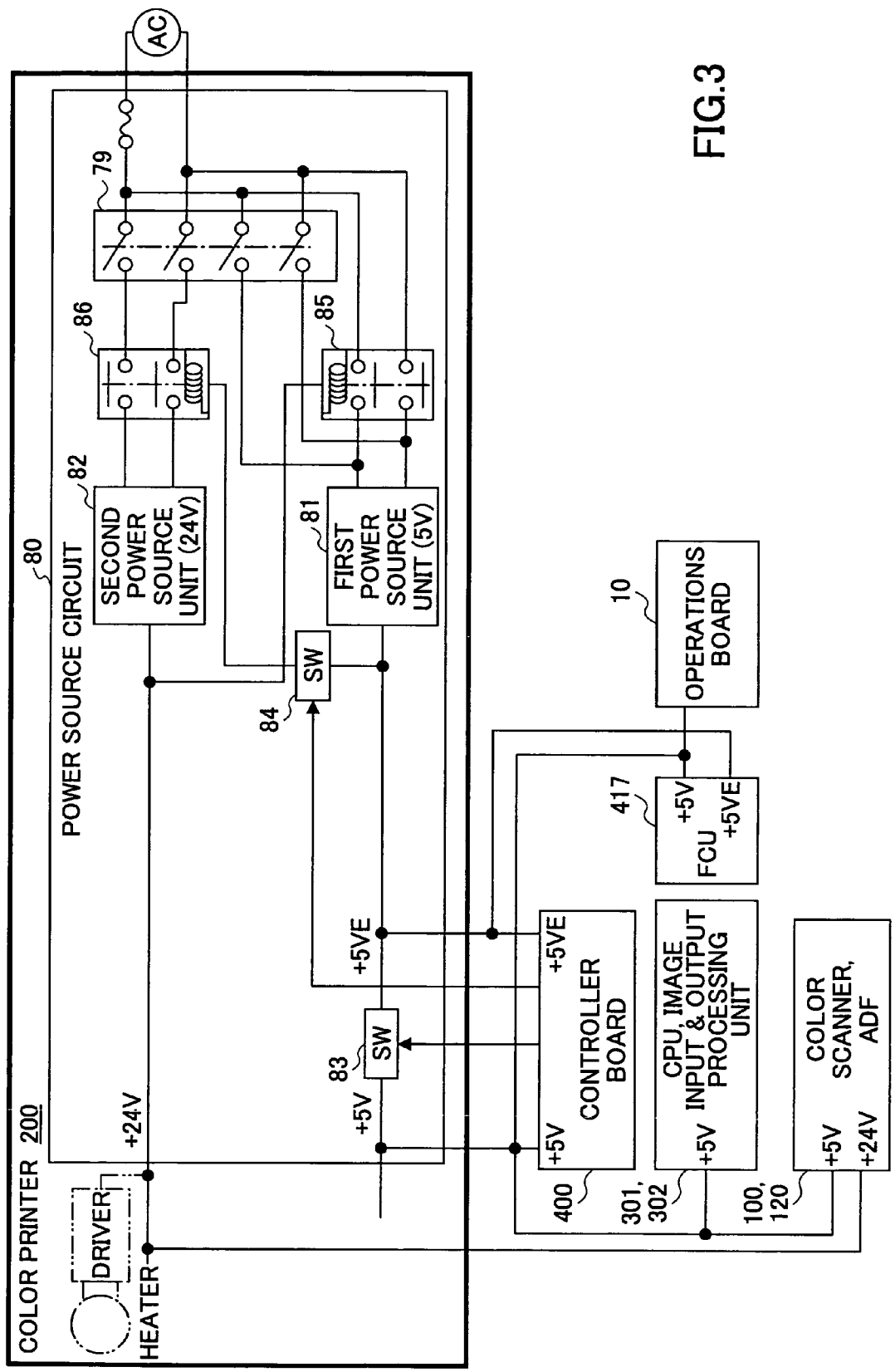
FIG. 3 is a block diagram showing a power source circuit of the multifunctional copying machine according to a first embodiment of the present invention.

FIG. 3 is a block diagram showing a power source circuit 80 of the multifunctional copying machine MF1 according to the first embodiment of the present invention. The power source circuit 80 supplies power to all the structural elements in the multifunctional copying machine MF1 shown in FIGS. 1 and 2. When the main power switch 79 is closed, a commercial alternating voltage 100 V is applied to a first power source unit 81 of the power source circuit 80, and the first power source unit 81 outputs a voltage of 5 V. A second relay 86 is driven by the output voltage from the first power source unit 81 and is turned on, the commercial alternating voltage 100 V is applied to a second power source unit 82, and the second power source unit 82 outputs a voltage of 24 V. A first relay 85 is driven by an output voltage from the second power source unit 82 and is turned on, and the commercial alternating voltage 100 V is applied to the first power source unit 81 by bypassing the main power switch 79. As shown in FIG. 3, the main power switch 79 provides two switching circuits, and supplies AC power to the first power source unit 81 and the second relay 86 separately.

The first power source unit 81 and the second power source unit 82 each includes a rectifying and smoothing circuit for rectifying the commercial alternating 100 V to a direct current and smoothing the direct current, and a DC/DC converter for converting the direct current into a direct current of a setting voltage (5 V, 24 V). The DC/DC converter outputs stabilized direct current power having a set voltage (5 V, 24 V) by restraining over-current with PWM (pulse width modulation) by performing ON/OFF control of a switching element of a primary side chopping circuit (switching regulator).

The power source circuit 80 includes switches 83 and 84 for controlling power saving, which are switched over between the sleep mode (power saving mode) and the standby mode (operating mode). In the first embodiment, the switch 83 is disposed in a 5 V output line which is output from the first power source unit 81, and the switch 84 is disposed in a control line for turning on/off the second relay 86 (second switching unit) which supplies/cuts power to the second power source unit 82. Control signals for turning on/off the switches 83 and 84 for controlling power saving are given from the controller board 400 to the switches 83 and 84. In the standby mode (operating mode) by which image forming can be started without a substantial delay in response to a copy start command or a print command, the controller board 400 turns on the switches 83 and 84 by the above control signals. In the sleep mode, the controller board 400 turns off the switch 84 which supplies +24 V and the switch 83 which supplies +5 V. In the sleep mode, the switches 83 and 84 are turned off; however, a detection voltage +5 V is supplied to the detection signal lines of the pressure plate switch of the color scanner 100, the filler sensor of the ADF 120, and the power source key of the operations board 10, from the ACD of the controller board 400. In addition, the voltage of +5 V is continuously applied to an electric circuit which detects a print command from a PC and a facsimile reception detecting circuit of the FCU.

The multifunctional copying machine MF1 does not includes a fixing unit (fuser) which is used in a printer of an electrophotographic system and requires a high voltage. Even when a heater and/or a fan is installed so as to hasten drying ink ejected on a recording paper, the high voltage is not needed. When an air-conditioning unit, such as a heater, a cooler, and a fan is installed so as to dry ink or to control temperature in the machine, the air-conditioning unit is driven by the +24 V.

When the main power switch 79 is in an OFF state, AC power is not supplied to the second power source unit 82. Therefore, the second power source unit 82 and the first relay 85 (first switching unit), which is switched to an ON state by an output from the second power source unit 82, are in an OFF state. Since the main power switch 79 and the first relay 85 are in an OFF state, the first power source unit 81 is in an OFF state. In addition, at this time, the second relay 86 (second switching unit), which is switched to an ON state by an output voltage from the first power source unit 81, is in an OFF state naturally. That is, when the main power switch 79 is in the OFF state, the first power source unit 81, the second power source unit 82, the first relay 85, and the second relay 86 are in the OFF state.

When the main power switch 79 is turned on, AC power is supplied to the first power source unit 81. Since the second relay 86 is still in the OFF state, the AC power is supplied to the front of the second relay 86. Therefore, the output of the first power source unit 81 starts a rising operation and the second power source unit 82 is still in the OFF state. After this, when the output voltage of the first power source unit 81 becomes a sufficiently high voltage, the second relay 86 is switched to an ON state, AC power is started to be supplied to the second power source unit 82, and the output of the second power source unit 82 starts to rise. When the output voltage of the second power source unit 82 becomes a sufficiently high voltage, the first relay 85 is switched to an ON state. With this, the AC power can be supplied to the first power source unit 81 by the bypass. Therefore, when the main power switch 79 is in the ON state, the first power source unit 81 outputs the voltage of 5 V, the second power source unit 82 outputs the voltage of 24 V, and the main power switch 79, the first relay 85, and the second relay 86 are in the ON state.

When the main power switch 79 is turned off from the ON state, the supply of AC power to the second power source unit 82 is cut off. However, the supply of the AC power to the first power source unit 81 is not cut off immediately by the ON state of the first relay 85; therefore, the first power source unit 81 does not stop the operation. When the output voltage of the second power source unit 82 starts to decrease due to starting a stopping operation and becomes a voltage by which the first relay 85 cannot be maintained in the ON state, the supply of the AC power to the first power source unit 81 is cut off by an OFF state of the first relay 85.

Therefore, the ON sequence of the first and second power source units 81 and 82 at the time when the main power switch 79 is turned on can be surely the order from ON of the first power source unit 81 to ON of the second power source unit 82. Further, the OFF sequence of the first and second power source units 81 and 82 at the time when the main power switch 79 is turned off can be surely the order from OFF of the second power source unit 82 to OFF of the first power source unit 81. That is, the first power source unit 81 with high priority in the control system can always be in operation when the second power source unit 82 with low priority is in operation.

Figure 4:
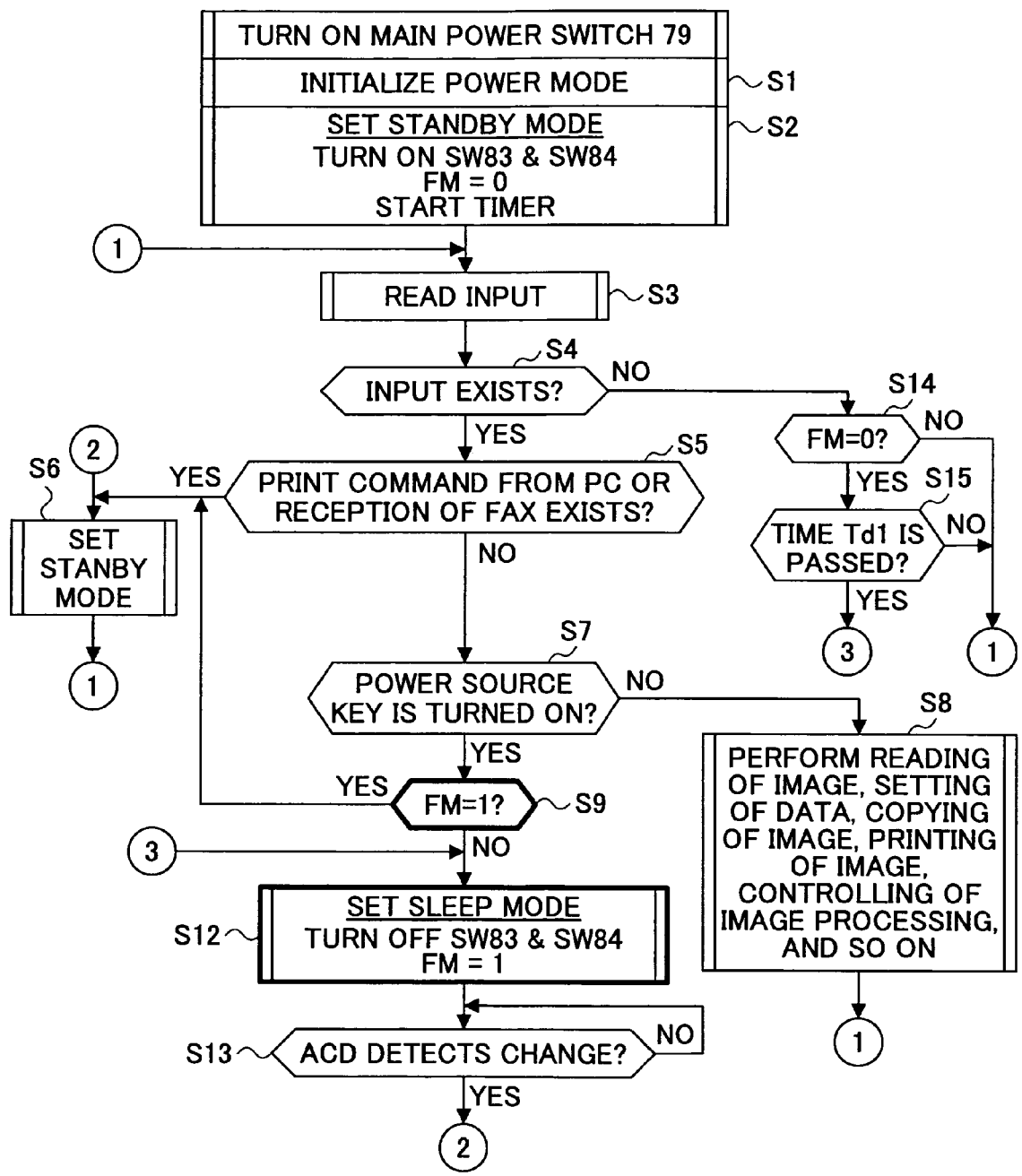
FIG. 4 is a flowchart showing power saving control which is performed by a CPU in a controller board shown in FIG. 2.

Next, power saving control which is performed by the CPU 402 in the controller board 400 is explained. FIG. 4 is a flowchart showing the power saving control which is performed by the CPU 402 in the controller board 400 shown in FIG. 2. In FIG. 4, switching control between the standby mode and the sleep mode which is performed by the CPU 402 in the controller board 400 is shown. First, when the main power switch 79 between the power source circuit 80 and the commercial alternating power source AC is turned on and AC power is supplied to the power source circuit 80, the CPU 402 in the controller board 400 initializes a power mode (step S1) and sets a standby mode (step S2). That is, the switches 83 and 84 are turned on. Data FM in a power saving mode register is set to "0" which shows the standby mode, and makes a timer start by causing a switching waiting time from the standby mode to the sleep mode Td1 to be a time limit value. In this, "FM=1" signifies the sleep mode.

By the setting the standby mode, each of operating voltages is applied to corresponding elements in the multifunctional copying machine MF1. A CPU (not shown) of the operations board 10 initializes power in the operations board 10 in response to the operating voltage application by the setting the standby mode (step S2), and displays copying conditions of a normal processing mode on a liquid crystal touch screen in the operations board 10 by reading the conditions from an NVRAM (not shown) in the operations board 10.

The CPU of the operations board 10 reads a user input on the operations board 10 and informs the CPU 402 in the controller board 400 of the user input (step S3). In addition, the CPU of the operations board 10 reads a command from the PC or the FCU. The CPU of the operations board 10 controls reading operations and displaying information in the multifunctional copying machine MF1. That is, the CPU of the operations board 10 reads a key input of an image processing mode, changes displaying contents on the liquid crystal touch screen, and performs operations corresponding to a user operation. The operations to be performed by the CPU are to read input figures, generate data from input figures, read start key pushing, transfer a start instruction to the controller board 400, read an input of paper size changing, and so on.

The switching waiting time from the standby mode to the sleep mode Td1 can be input from the operations board 10, and the input value is stored in the NVRAM in the operations board 10.

When an input exists (YES in step S4), it is determined whether the input is a print command from the PC or a reception of facsimile from the FCU (step S5). When the input is the print command or the reception of facsimile (YES in step S5), the CPU 402 switches over the power source circuit 80 from the sleep mode to the standby mode (step S6). When an input exists (YES in step S4), and the input is a user input on the operations board 10 (NO in step S5), the CPU 402 of the controller board 400 performs steps corresponding to the instruction of the user input (steps S7 and S8). As the user input, there are a key input of an image processing mode, a figure input, a start key pushing input, a paper size changing input, and so on. When the standby mode is set (step S2), the input exists (YES in step S4), the input is the user input (NO in step S5), when the power source key of the operations board 10 is turned on (YES in step S7), the CPU of the operations board 10 and the CPU 402 of the controller board 400 regard the user operation to be an instruction to switch to the sleep mode, and when the mode is not the sleep mode (NO in step S9), and the CPU 402 reads the image processing mode which is displayed on the liquid crystal touch screen in the NVRAM in the operations board 10 as the previous mode, and switches over the mode from the standby mode to the sleep mode (step S12). When the mode is switched over to the sleep mode, the CPU 402 waits for generation of a change detecting signal at the ACD (state change detection circuit). When the ACD detects a change detecting signal (YES in step S13), the CPU 402 sets the power source circuit 80 to the standby mode (step S6). In addition, when a print command is received from the PC while waiting for the generation of the change detecting signal, the CPU 402 sets the power source circuit 80 to the standby mode (step S6).

When the power source key is turned on (YES in step S7) while setting the sleep mode, the CPU 402 regards the user operation to be an instruction to switch over to the standby mode (YES in step S9), and the CPU 402 sets the mode to the standby mode (step S6). In addition, the CPU 402 reads the previous image processing mode stored in the NVRAM in the operations board 10 and displays the read result on the liquid crystal touch screen of the operations board 10.

When an input does not exists (NO in step S4), the CPU 402 confirms that the mode is the standby mode (YES in step S14) and the CPU 402 checks that the switching waiting time from the standby mode to the sleep mode Td1 is passed in the timer while awaiting the input. When the time Td1 is passed (YES in step S15), the CPU 402 of the controller board 400 switches the mode to the sleep mode (step S12).

Second Embodiment

Next, a second embodiment of the present invention is explained. In the second embodiment of the present invention, the basic structure and the operating functions of the multifunctional copying machine MF1 are the same as those in the first embodiment; however, the structure of the power source circuit is different from that in the first embodiment.

Figure 5:
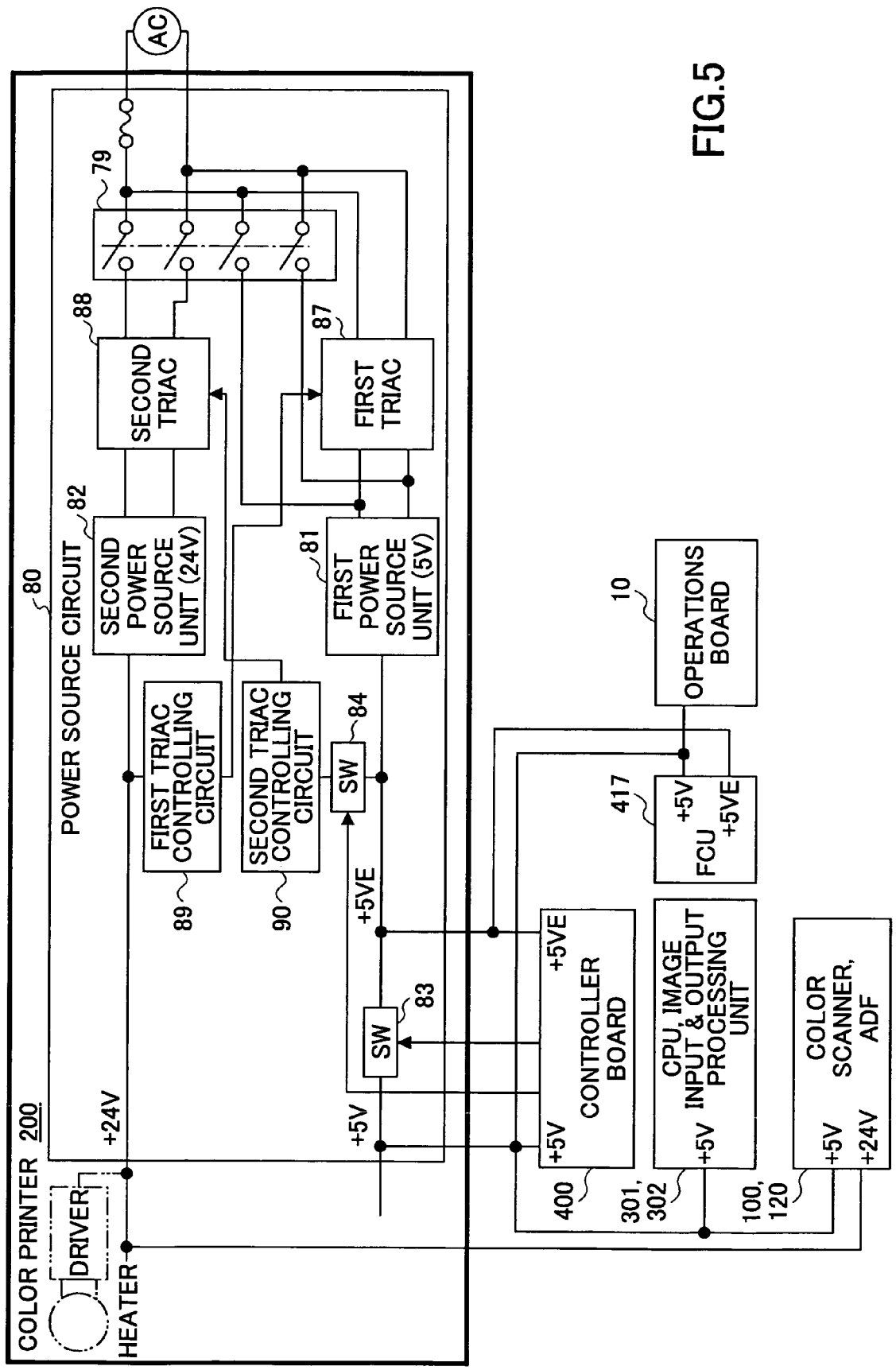
FIG. 5 is a block diagram showing a power source circuit of the multifunctional copying machine according to a second embodiment of the present invention.

FIG. 5 is a block diagram showing a power source circuit 80 of the multifunctional copying machine MF1 according to the second embodiment of the present invention. In FIG. 5, the reference number of the power source circuit is the same as that in the first embodiment shown in FIG. 3. However, the contents of the power source circuit 80 according to the second embodiment are different from those in the first embodiment.

In the second embodiment of the present invention, the first and second switching units (the first and second relays 85 and 86) in the first embodiment are replaced by first and second TRIACs (triode AC switches) 87 and 88, respectively. In addition, a first TRIAC control circuit 89 which drives the first TRIAC 87 to turn on and a second TRIAC control circuit 90 which drives the second TRIAC to turn on are included in the second embodiment. Even if the above structure is used, the operations, the functions, and the effects are the same as those in the power source circuit 80 in the first embodiment shown in FIG. 3. When the TRIACs are used as the first and second switching units, the control can be easily performed, the manufacturing cost can be made low, and a small-sized design can be executed.

Third Embodiment

Next, a third embodiment of the present invention is explained. In the third embodiment of the present invention, the basic structure and the operating functions of the multifunctional copying machine MF1 are the same as those in the first embodiment; however, the structure of the power source circuit is different from that in the first embodiment.

Figure 6:
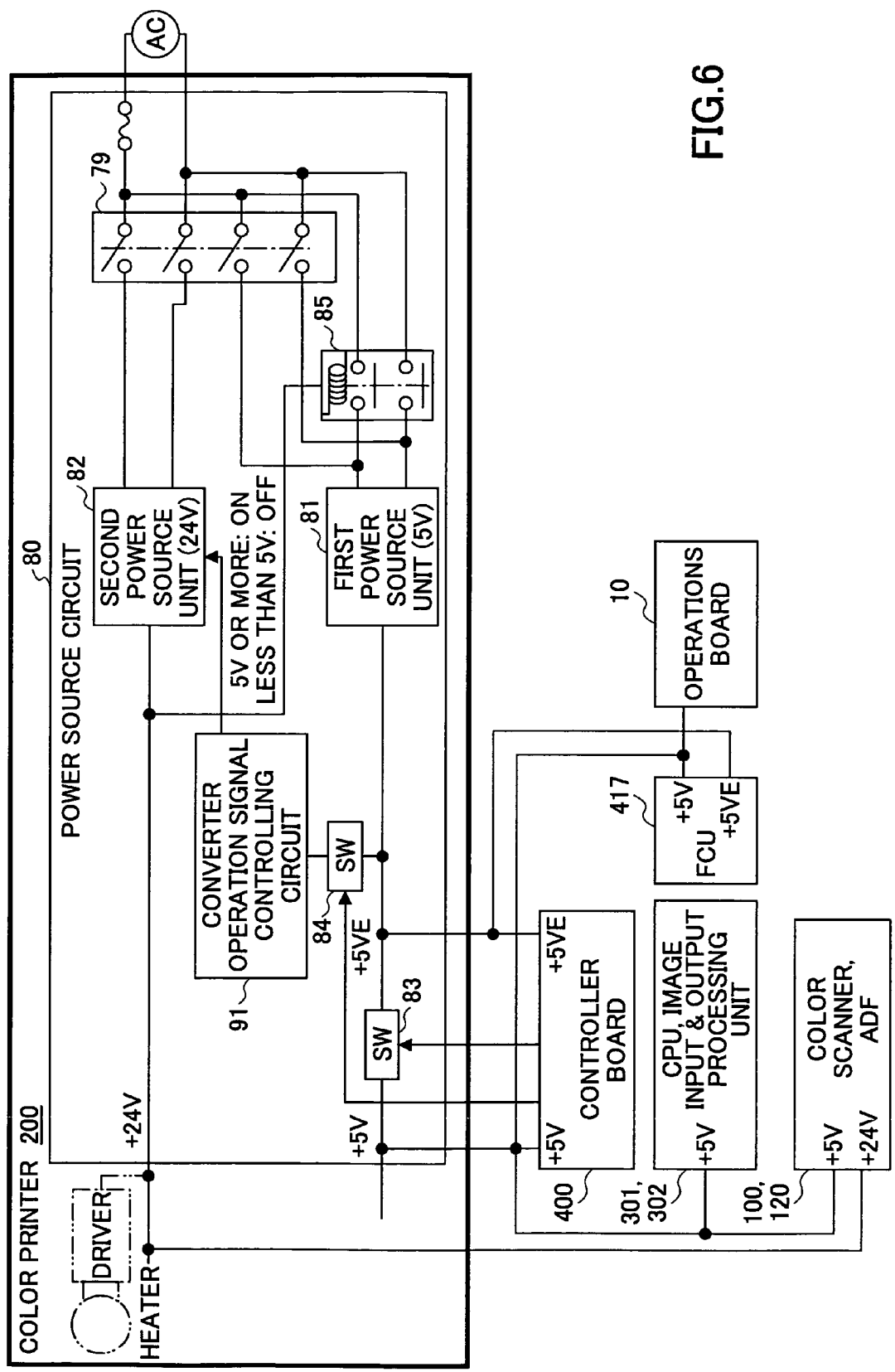
FIG. 6 is a block diagram showing a power source circuit of the multifunctional copying machine according to a third embodiment of the present invention.

FIG. 6 is a block diagram showing a power source circuit 80 of the multifunctional copying machine MF1 according to the third embodiment of the present invention. In FIG. 6, the reference number of the power source circuit is the same as that in the first embodiment shown in FIG. 3. However, the contents of the power source circuit 80 according to the third embodiment are different from those in the first embodiment.

As shown in FIG. 6, in the third embodiment, as the output cutting off unit of the second power source unit 82, the second relay 86 in the first embodiment is replaced by a switching element of a primary side chopping circuit (switching regulator) of a DC/DC converter built in the second power source unit 82. In addition, a converter operation signal controlling circuit 91 is included in the power source circuit 80. An output voltage from the first power source unit 81 is input to the converter operation signal controlling circuit 91. The converter operation signal controlling circuit 91 outputs a converter operation signal (operation start signal) when an output voltage from the first power source unit 81 is, for example, 4.75 V or more, and outputs a converter operation stop signal when the output voltage from the first power source unit 81 is less than 4.75 V (in FIG. 6, the voltage is shown as 5 V). The output signal drives the switching element in the second power source unit 82 to turn on/off. That is, the output voltage is applied to a driving circuit in the DC/DC converter, and the driving circuit drives the switching element to turn on when the converter operation signal is given, and drives the switching element to turn off when the converter operation stop signal is given.

Fourth Embodiment

Next, a fourth embodiment of the present invention is explained. In the fourth embodiment of the present invention, the basic structure and the operating functions of the multifunctional copying machine MF1 are the same as those in the first embodiment; however, the structure of the power source circuit is different from that in the first embodiment.

Figure 7:
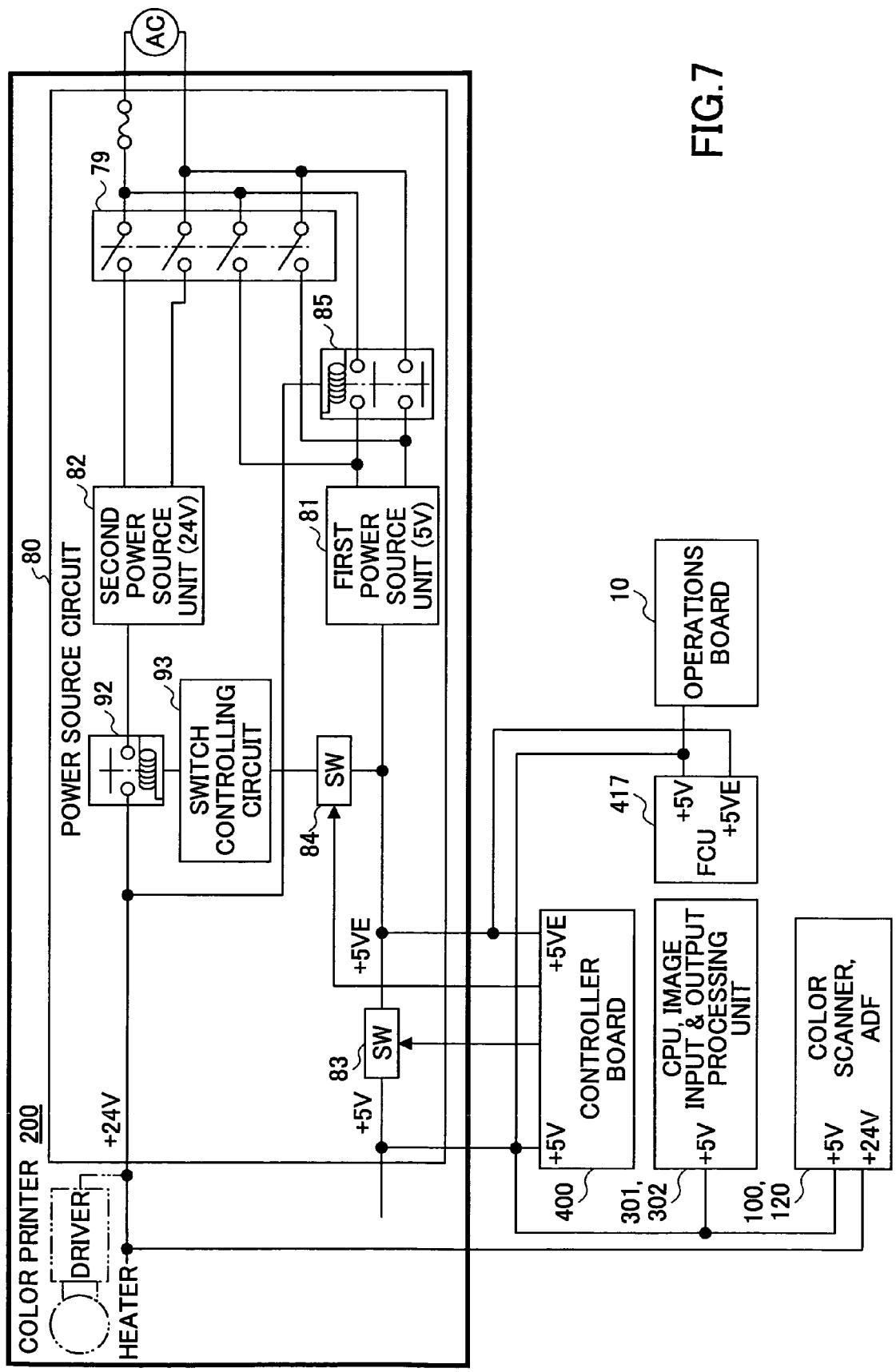
FIG. 7 is a block diagram showing a power source circuit of the multifunctional copying machine according to a fourth embodiment of the present invention.

FIG. 7 is a block diagram showing a power source circuit 80 of the multifunctional copying machine MF1 according to the fourth embodiment of the present invention. In FIG. 7, the reference number of the power source circuit is the same as that in the first embodiment shown in FIG. 3. However, the contents of the power source circuit 80 according to the fourth embodiment are different from those in the first embodiment.

As shown in FIG. 7, in the fourth embodiment, as the output cutting off unit of the second power source unit 82, the second relay 86 in the first embodiment is replaced by a relay 92 which turns on/off the output (24 V) of the second power source unit 82. In addition, a switch controlling circuit 93 is newly included in the power source circuit 80. An output voltage from the first power source unit 81 is input to the switch controlling circuit 93. The switch controlling circuit 93 outputs a driving voltage which turns on the relay 92 when an output voltage from the first power source unit 81 is, for example, 4.75 V or more, and stops the output of the driving voltage and turns off the relay 92 when the output voltage from the first power source unit 81 is less than 4.75 V. In FIG. 7, the relay 92 turns on/off the output of the second power source unit 82; however, a transistor or an FET can be used in place of the relay 92. In case of the relay 92, the output voltage of the first power source unit 81 can be directly input to the relay 92 by omitting the switch controlling circuit 93.

Fifth Embodiment

Next, a fifth embodiment of the present invention is explained. In the fifth embodiment of the present invention, the basic structure and the operating functions of the multifunctional copying machine MF1 are the same as those in the first embodiment; however, the structure of the power source circuit is different from that in the first embodiment.

Figure 8:
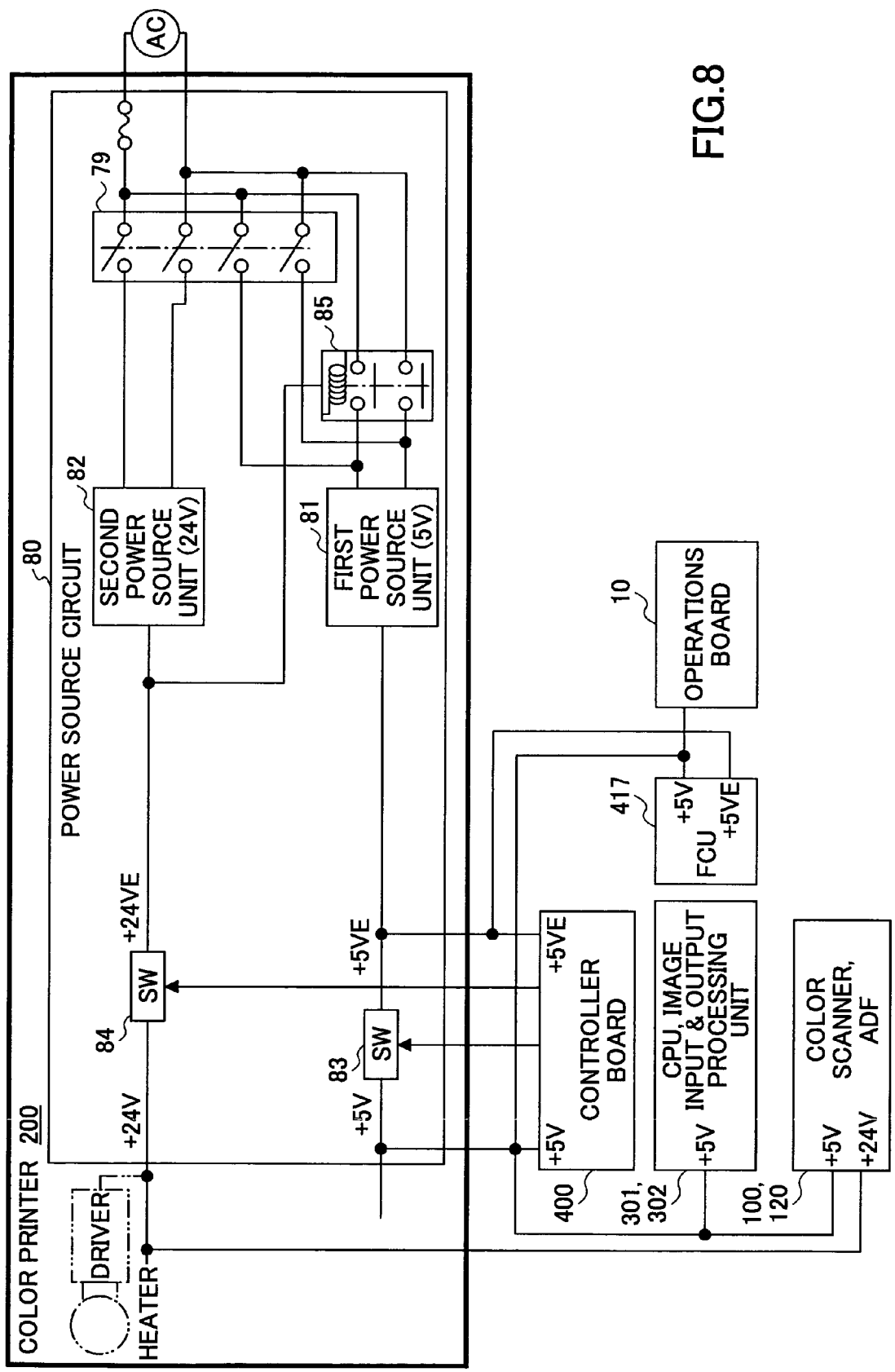
FIG. 8 is a block diagram showing a power source circuit of the multifunctional copying machine according to a fifth embodiment of the present invention.

FIG. 8 is a block diagram showing a power source circuit 80 of the multifunctional copying machine MF1 according to the fifth embodiment of the present invention. In FIG. 8, the reference number of the power source circuit is the same as that in the first embodiment shown in FIG. 3. However, the contents of the power source circuit 80 according to the fifth embodiment are different from those in the first embodiment.

As shown in FIG. 8, in the fifth embodiment, the second relay 86 using in the first embodiment is omitted, and the position of the switch 84 for power saving of 24 V output is different from that in the first embodiment. That is, the switch 84 is disposed in the output line of the second power source unit 82.

In the structure of the fifth embodiment, when the main power switch 79 is turned on, since AC power is supplied to the first and second power source units 81 and 82, the first power source unit 81 outputs 5 V, and the second power source unit 82 outputs 24 V. In addition, the first relay 85 is switched to an ON state by the 24 V output. In this state, when the main power switch 79 is turned off, the supply of the AC power to the second power source unit 82 is cut off; however, the supply of the AC power to the first power source unit 81 is not cut off immediately by the ON state of the first relay 85. Consequently, the first power source unit 81 is not stopped. The second power source unit 82 starts the stopping operation and the output voltage of the second power source unit 82 starts to fall, and when the output voltage becomes a voltage which cannot maintain the ON state of the first relay 85, the supply of the AC power to the first power source unit 81 is cut off. Therefore, the OFF sequence of the first and second power source units 81 and 82 at the time when the main power switch 79 is turned off can be surely the order from OFF of the second power source unit 82 to OFF of the first power source unit 81.

Sixth Embodiment

Next, a sixth embodiment of the present invention is explained. In the sixth embodiment of the present invention, the basic structure and the operating functions of the multifunctional copying machine MF1 are the same as those in the first embodiment; however, the structure of the power source circuit is different from that in the first embodiment.

Figure 9:
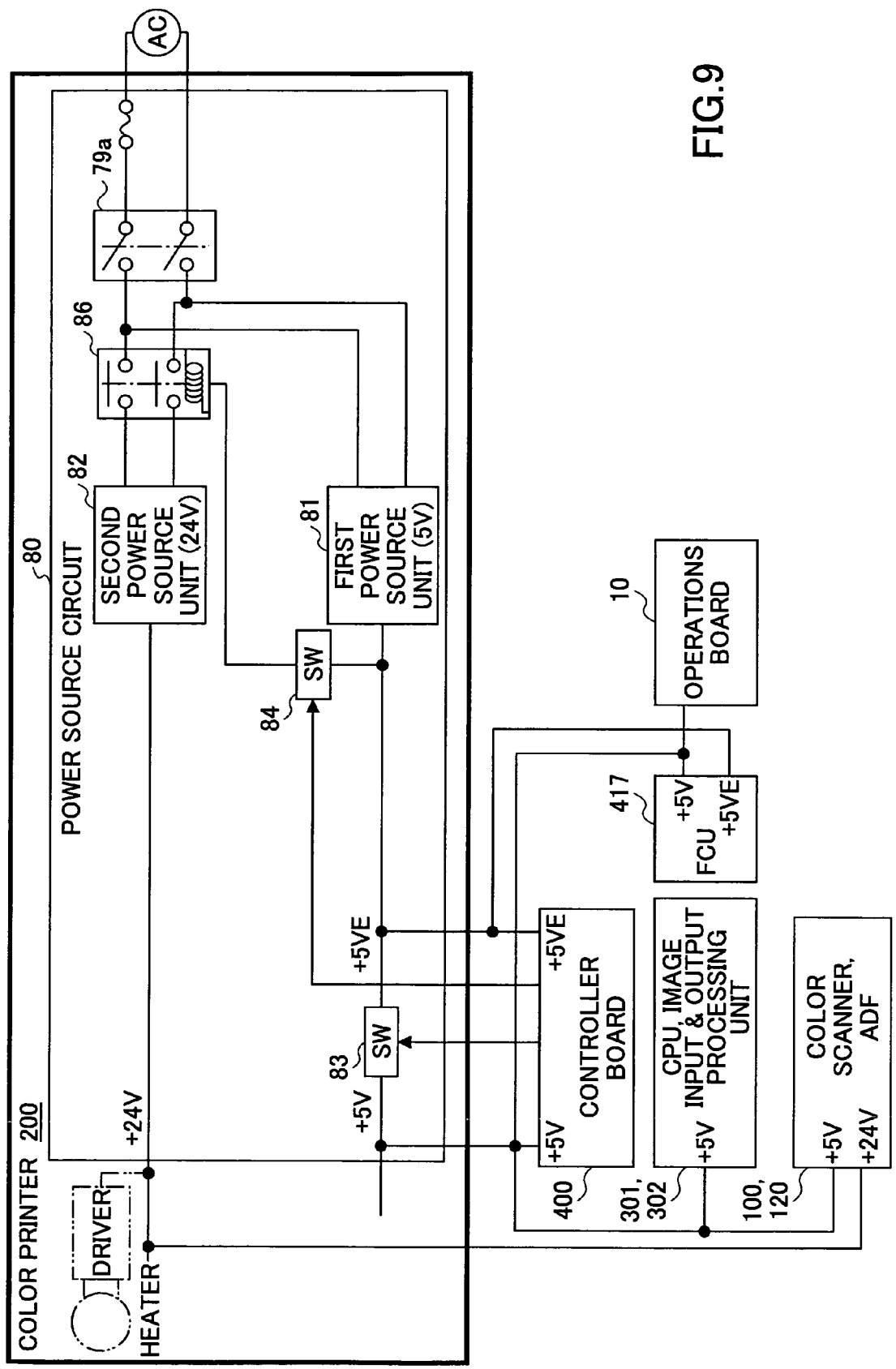
FIG. 9 is a block diagram showing a power source circuit of the multifunctional copying machine according to a sixth embodiment of the present invention.

FIG. 9 is a block diagram showing a power source circuit 80 of the multifunctional copying machine MF1 according to the sixth embodiment of the present invention. In FIG. 9, the reference number of the power source circuit is the same as that in the first embodiment shown in FIG. 3. However, the contents of the power source circuit 80 according to the sixth embodiment are different from those in the first embodiment.

As shown in FIG. 9, in the sixth embodiment, a main power switch 79a is different from the main power switch 79 using in the first embodiment; in addition, the first relay 85 using in the first embodiment is omitted. AC power is supplied to the first power source unit 81 and the second relay 86 via the main power switch 79a. The AC power is supplied to the second power source unit 82 via the second relay 86. That is, the main power switch 79a, the second relay 86, and the second power source unit 82 are connected in series. The second relay 86 is turned on by the output voltage of 5 V from the first power source unit 81. In this structure, when the main power switch 79a is turned off, the supply of the AC power is cut off in front of the main power switch 79a and the AC power is not supplied to the first and second power source units 81 and 82. Since the voltage is not output from the first power source unit 81, the second relay 86 is in the OFF state.

When the main power switch 79a is turned on, AC power is supplied to the first power source unit 81, since the second relay 86 is in an OFF state, the AC power is not supplied to the second power source unit 82. Therefore, the output of the first power source unit 81 starts the rising operation; however, the second power source unit 82 is in an OFF state. After this, when the output from the first power source unit 81 becomes a sufficiently high voltage, the second relay 86 is turned on, and the supply of the AC power to the second power source unit 82 is started and the output of the second power source unit 82 starts to rise. Therefore, the ON sequence of the first and second power source units 81 and 82 can be the order from ON of the first power source unit 81 to ON of the second power source unit 82.

Figure 10:
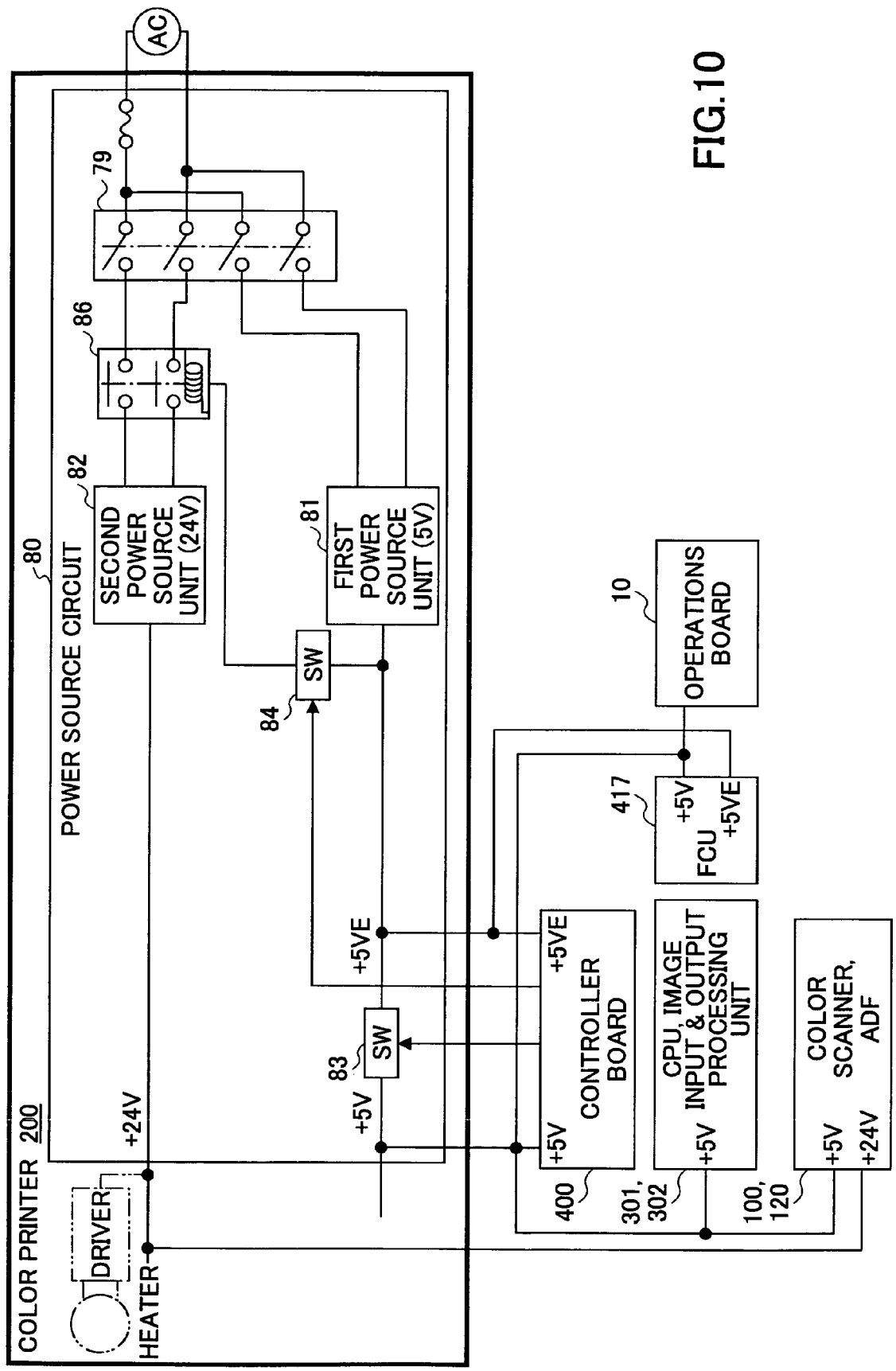
FIG. 10 is a block diagram showing a modified example of a power source circuit of the multifunctional copying machine according to the sixth embodiment of the present invention.

FIG. 10 is a block diagram showing a modified example of the power source circuit 80 of the multifunctional copying machine MF1 according to the sixth embodiment of the present invention. As shown in FIG. 10, in the modified example of the sixth embodiment, the main power switch 79 with two circuits is used in place of the main power switch 79a. When the AC power is divided into two routes by using the main power switch 79, a current flowing into each circuit becomes small, and stress applied on contact points of the main power switch 79 becomes small. With this, the service life of the component can be longer.

Further, the present invention is not limited to the specifically disclosed embodiments, and variations and modifications may be made without departing from the scope of the present invention.

The present invention is based on Japanese Priority Patent Application No. 2005-081970, filed on Mar. 22, 2005, with the Japanese Patent Office, the entire contents of which are hereby incorporated by reference.

What is claimed is:

1. A power source which includes a first power source unit that applies a first operating voltage to a control unit and a second power source unit that applies a second operating voltage to a unit to be controlled by the control unit, comprising:
a first electric power supplying unit that supplies electric power to the first power source unit; and
a second electric power supplying unit that supplies the electric power to the second power source unit; wherein the first electric power supplying unit includes a parallel circuit composed of a main power switch and a first switching unit capable of being electrically controlled, the electric power is supplied to the first power source unit by turning on the main power switch, and the first switching unit is turned on by a voltage output from the second power source unit; and
the second electric power supplying unit includes a series circuit composed of the main power switch and a second switching unit capable of being electrically controlled, and the electric power is supplied to the second power source unit by turning on the second switching unit by a voltage output from the first power source unit.

2. The power source as claimed in claim 1, wherein:
the second switching unit which is turned on by the voltage output from the first power source unit is disposed at the output side of the second power source unit.

3. The power source as claimed in claim 1, wherein:
the first switching unit is a first TRIAC (triode AC switch) and the second switching unit is a second TRIAC.

4. The power source as claimed in claim 1, wherein:
the second switching unit is a switching element in a primary side chopping circuit of a converter in the second power source unit; and
the power source further includes a converter operation signal controlling unit that outputs to the second power source unit a signal which allows turning on the switching element when a voltage output from the first power source unit exists and a signal which prevents turning on the switching element when a voltage output from the first power source unit does not exist.

5. The power source as claimed in claim 1, further comprising:
a first power saving controlling switch; wherein the first power saving controlling switch is disposed on a voltage output line from the first power source unit.

6. The power source as claimed in claim 1, further comprising:
a second power saving controlling switch; wherein the second power saving controlling switch is disposed between the first power source unit and the second switching unit.

7. An image forming apparatus, comprising:
the power source as claimed in claim 1; and
an image forming unit to which electric power is supplied from the power source.

8. The image forming apparatus as claimed in claim 7, further comprising:
a manuscript reading unit that forms image data expressing an image by reading the image of a manuscript; and
an image data processing unit that transforms the image data into image data fitting to an image being formed by the image forming unit.

* * * * *